United States Patent Office 3,118,004
Patented Jan. 14, 1964

3,118,004
FLUORINATED ORGANIC IODIDES
Murray Hauptschein, Glenside, and Robert E. Oesterling, Flourtown, Pa., assignors to Pennsalt Chemicals Corporation, Philadelphia, Pa., a corporation of Pennsylvania
No Drawing. Filed May 23, 1962, Ser. No. 196,918
5 Claims. (Cl. 260—644)

This invention relates to novel fluorinated nitroiodides.
The new compounds of the invention are those represented by the general formula:

$$ICF_2CHRNO_2$$

where R is selected from the class consisting of hydrogen, fluorine, perfluoroalkyl radicals, and fluorohydroalkyl radicals. As used herein perfluoroalkyl means an alkyl radical containing only carbon and fluorine and fluorohydroalkyl means an alkyl radical containing only carbon, fluorine and hydrogen wherein the molar ratio of fluorine to hydrogen is at least 1:1.

Particularly preferred are the compounds where R is hydrogen or fluorine, i.e. the compounds $ICF_2CH_2NO_2$ and $ICF_2CHFNO_2$. Where R is perfluoroalkyl or fluorohydroalkyl, the radical prefeably contains from 1 to 10 carbon atoms and most desirably from 1 to 6 carbon atoms.

The compounds of the invention are pepared by reacting a fluorinated olefin of the formula $CF_2=CHR$, where R is as defined above, with dinitrogen tetroxide ($N_2O_4$) in the presence of iodine. The reaction may be represented as follows:

$$CF_2=CHR + N_2O_4 + I_2 \rightarrow ICF_2CHRNO_2$$

Usually, variable amounts of the reverse addition product are formed concurrently according to the following:

$$CF_2=CHR + N_2O_4 + I_2 \rightarrow ICHRCF_2NO_2$$

Also, in some cases variable amounts of an iodo nitrite or nitrate are formed which readily hydrolyses to the corresponding acid. Thus, e.g.

$$CF_2=CHR + N_2O_4 + I_2 \longrightarrow$$

$$ICHRCF_2ONO \text{ (or } ICHRCF_2ONO_2) \xrightarrow{H_2O}$$

$$ICHRCF_2OH \xrightarrow{H_2O} ICHR\overset{O}{\overset{\|}{C}}OH$$

The reaction may be carried out at temperatures ranging from about 0° to 100° C., preferably 20° to 50° C., and at pressures ranging from atmospheric to moderately elevated pressures ranging up to e.g. 1000 lbs./in.² depending on the reaction temperature and volatility of the reactants. The reaction time is not critical and generally reaction periods range from a few minutes to a day. The molar ratios of the reactants are not critical and may vary widely. A stoichiometric excess of iodine is preferred, while the ratio of $N_2O_4$ to olefin may vary e.g. from 3:1 to 1:3.

The reaction is desirably carried out in the presence of a solvent which is unreactive to $N_2O_4$ under the reaction conditions. Preferred are the halogenated solvents, particularly the chlorinated or chlorofluorinated solvents such as chloroform, methylene chloride, carbon tetrachloride, trichlorotrifluoroethane, etc. The amount of solvent is not critical and generally may be used in amounts ranging from 100 to 1000 milliliters per mole of olefin. Desirably, the reaction is carried out under substantially anhydrous conditions to avoid reactions between $N_2O_4$ and water and the possibility of other side reactions.

As is well known, dinitrogen tetroxide ($N_2O_4$) is probably an equilibrium mixture of $N_2O_4$ with various other forms of nitrogen oxides, particularly $NO_2$, whose composition changes depending principally upon the temperature. This behavior of $N_2O_4$ is described, e.g. by J. L. Riebsomer in Chemical Reviews, vol. 36, No. 2, April 1945, pp. 157 et seq. As used herein the term "dinitrogen tetroxide" ($N_2O_4$) is intended to include the various equilibrium mixtures that are obtained under the reaction conditions specified herein.

Where it is desired to minimize the production of nitrites or nitrates, the reaction is preferably carried out by adding the dinitrogen tetroxide slowly to a mixture of the iodine and olefin such that the iodine and olefin are always in excess. The formation of the nitrite or nitrate is believed to occur more readily in the presence of excess $N_2O_4$.

Typical examples of precursor olefins and the nitroiodides that are obtained therefrom in accordance with the invention are the following:

| Precursor olefin | Nitroiodide |
|---|---|
| $CF_2=CH_2$ | $ICF_2CH_2NO_2$ |
| $CF_2=CHF$ | $ICF_2CHFNO_2$ |
| $CF_2=CHCF_3$ | $ICF_2CH(NO_2)CF_3$ |
| $CF_2=CHC_3F_7$ | $ICF_2CH(NO_2)C_3F_7$ |
| $CF_2=CHCF_2CH_2CF_3$ | $ICF_2CH(NO_2)CF_2CH_2CF_3$ |
| $CF_2=CH[CF_2CH_2]_3C_3F_7$ | $ICF_2CH(NO_2)[CF_2CH_2]_3C_3F_7$ |
| $CF_2=CH\overset{CF_3}{\underset{|}{C}}FCF_3$ | $ICF_2CH(NO_2)\overset{CF_3}{\underset{|}{C}}FCF_3$ |

Percursor olefins of the type $CF_2=CHR$ where R is perfluoroalkyl or fluorohydroalkyl are prepared in accordance with the procedures described in copending application Serial No. 53,878, filed September 6, 1960, of Murray Hauptschein et al.

The compounds of the invention are characterized by the ease with which they react with alkanols to form fluorinated nitroethers. For example, ethyl alcohol reacts with $ICF_2CH_2NO_2$ as follows:

$$C_2H_5OH + ICF_2CH_2NO_2 \rightarrow C_2H_5OCF_2CH_2NO_2 + HI$$

Reactions of this type (which are disclosed in more detail in copending application of Murray Hauptschein and Milton Braid, Serial Number 198,464, filed May 29, 1962, entitled Flourinated Organic Ethers) are believed to proceed by the elimination of HI from the alpha and beta carbon atoms to form a terminal nitroolefin to which the alcohol then adds. This reaction is unique to the nitroiodides of the invention containing a terminal —$CF_2I$ group and a beta hydrogen atom.

In addition to serving as intermediates for the preparation of fluorinated nitroethers as indicated above, the compounds of the invention are also useful for the preparation of fluorinated nitro compounds of the general formula $CF_3CHRNO_2$ by the reaction of the corresponding iodide with an alkali metal fluoride. For example, the nitroiodide $ICF_2CH_2NO_2$ reacts with sodium fluoride in accordance with the following:

$$ICF_2CH_2NO_2 + NaF \rightarrow CF_3CH_2NO_2 + NaI$$

The compounds of the invention are also useful as soil fumigants, insecticides, herbicides, defoliants and as antiseptics providing a slow release of iodine.

The following examples illustrate several specific embodiments of the invention:

*Example 1*

PREPARATION OF $ICF_2CH_2NO_2$

A stainless steel autoclave of 1400 milliliters capacity is charged with 500 milliliters of methylene chloride, 92 g. (1.0 mole) of dinitrogen tetroxide and 381 g. (1.5 moles) of iodine, connected to a cylinder of vinylidene fluoride, and placed on a shaking apparatus. Vinylidene fluoride at a pressure of 250 lbs./in.² gage is introduced into the autoclave at room temperature. Within five to ten minutes the autoclave pressure drops to less than 100 lbs./in.² gage. The autoclave is repressured with vinylidene fluoride several additional times over a period of about 4 hours until the pressure remains constant at 200 lbs./in.² gage. During this procedure, the autoclave temperature remains at from 25° to 30° C., very little heat of reaction being noticeable. The autoclave is vented and the contents filtered to remove unreacted iodide. The methylene chloride solution is washed with aqueous sodium bisulfite until all iodine color is removed, giving a pale yellow solution. The solution is separated from the water wash and dried over anhydrous magnesium sulfate after which the methylene chloride is removed by distillation and the product vacuum distilled to give 161 g. of product having a boiling range of from 65 to 70° C. at 20 mm. Hg.

Analysis of this product by vapor-liquid chromatography and mass spectroscopy shows it to consist of the isomers $ICF_2CH_2NO_2$ and $ICH_2CF_2NO_2$ in about a 3:1 ratio.

A sample of pure $ICF_2CH_2NO_2$, having a boiling point of 61° C. at 11 mm. Hg and of 30° C. at 1 mm. Hg, and a refractive index $n_D^{26}$ 1.4750, analyzed as follows:

Calculated for: $C_2H_2F_2INO_2$: C, 10.13; H, 0.85; N, 5.91. Found: C, 10.13; H, 0.87; N, 5.97.

The infrared spectrum of $ICF_2CH_2NO_2$ (liquid) displays the following absorption bands: $3.27\mu$ (medium), $3.36\mu$ (medium), $3.42\mu$ (medium), $6.37\mu$ (very, very strong), $7.08\mu$ (very strong), $7.31\mu$ (very strong), $7.51\mu$ (very strong), $8.06\mu$ (very strong), $8.50\mu$ (very strong), $9.02\mu$ (very strong), $9.58\mu$ (very strong), $10.57\mu$ (very strong), $10.98\mu$ (very strong), $11.23\mu$ (very strong), $11.96\mu$ (strong), $13.17\mu$ (strong), $15+\mu$ (strong). The peaks at $6.37\mu$ and at $7.31\mu$ correspond to the asymmetric $NO_2$ and symmetric $NO_2$ stretching vibrations, respectively, of the —$CH_2NO_2$ group.

The ultraviolet spectrum of $ICF_2CH_2NO_2$ taken in isooctane solution has a maximum absorption at 270 m$\mu$.

A sample of pure $ICH_2CF_2NO_2$ having a boiling point of about 50° C. at 10 mm. Hg has an infrared spectrum with the following absorption bands: $3.27\mu$ (medium); $3.35\mu$ (medium); $3.40\mu$ (medium); $6.28\mu$ (very, very strong); $7.09\mu$ (strong); $7.40\mu$ (very strong); $7.76\mu$ (very strong); $7.96\mu$ (very strong); $8.51\mu$ (strong); $8.88\mu$ (very strong); $9.36\mu$ (very strong); $10.15\mu$ (very strong); $11.82\mu$ (very strong); $13.47\mu$ (very strong); $14.55\mu$ (strong). The peaks at $6.28\mu$ and at $7.40\mu$ correspond to the asymmetric $NO_2$ and symmetric $NO_2$ stretching vibrations, respectively, of the —$CF_2NO_2$ group.

The ultraviolet spectrum of the isomer $ICH_2CF_2NO_2$ taken in isooctane solution has a maximum absorption at 267 m$\mu$.

Example 2

PREPARATION OF $CF_3CH_2NO_2$ FROM $ICF_2CH_2NO_2$

The nitroiodide $ICF_2CH_2NO_2$ is converted to 1,1,1-trifluoro-2-nitroethane in good yield by the following procedure:

A mixture of 25 milliliters of dry tetramethylene sulfone, 9.3 g. (0.04 mole) of $ICF_2CH_2NO_2$ and 3 g. of dry sodium fluoride (0.07 mole) is stirred at 100° C. for 1.5 hours. The reaction mixture is then diluted with 200 milliliters of cold water and steam distilled giving a pale yellow oil which is separated and dried over anhydrous magnesium sulfate. A yield of 3.5 g. (68%) of crude $CF_3CH_2NO_2$ is obtained which on distillation at atmospheric pressure gives a pure colorless liquid, 1,1,1-trifluoro-2-nitroethane, boiling at 96° C. *Analysis.*—Calculated for: $C_2H_2F_3NO_2$: N, 10.86. Found: N, 10.99.

The infrared spectrum (liquid) shows the characteristic asymmetric $NO_2$ vibration at $6.34\mu$ and the symmetric $NO_2$ vibration at $7.33\mu$. The ultraviolet spectrum of $CF_3CH_2NO_2$ taken in isooctane had a maximum absorption of low intensity at 277 m$\mu$.

The above procedure provides an improved route to the compound $CF_3CH_2NO_2$.

Example 3

PREPARATION OF $ICF_2CH_2NO_2$

A 300 milliliter stainless steel autoclave is charged with 100 milliliters of methylene chloride, 51 g. (0.55 mole) of $N_2O_4$ and 64 g. (1 mole) of vinylidene fluoride. The autoclave and contents are shaken at room temperature for 30 hours. After venting the autoclave, the methylene chloride solution is washed with water and aqueous sodium bisulfite. The methylene chloride solution is then separated from the water wash, dried and distilled to give 34 g. of crude $C_2H_2F_2NO_2I$, mostly $ICF_2CH_2NO_2$.

The water and sodium bisulfite washed from this run are independently extracted with diethylether. From these ether extracts (after drying and removal of ether by distillation) there is obtained 15 g. of iodoacetic acid $CH_2ICOOH$, melting at 80–81° C., the infrared spectrum of which was identical to an authentic sample. In addition, 16 g. of $CH_2ICOOH$ are found in the residue after vacuum distillation of the nitroiodide. The iodoacetic acid probably results from the formation of a nitrite (or nitrate) by-product which is subsequently hydrolyzed to the acid in accordance with the following:

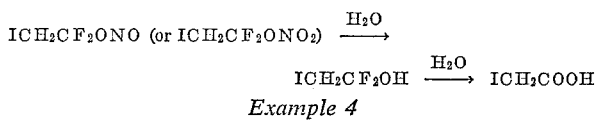

Example 4

PREPARATION OF $ICF_2CH_2NO_2$

This example illustrates a procedure for adding $N_2O_4$ slowly to a mixture of iodine and olefin to minimize the production of nitrite or nitrate. A 300 milliliter stainless steel autoclave is charged with 155 g. (0.61 mole) of iodine crystals; 75 milliliters of $CH_2Cl_2$; and 64 g. (1.0 mole) of $CF_2$=$CH_2$. A stainless steel cylinder is charged with 51 g. (0.55 mole) of $N_2O_4$ and 25 milliliters of $CH_2Cl_2$. The $CH_2Cl_2$ solution of $N_2O_4$ is pumped slowly into the autoclave loaded with the iodine and $CF_2$=$CH_2$ over a period of about 16 hours while shaking the autoclave at room temperature. After venting the autoclave and removal of about 68 g. of solid iodine, the methylene chloride solution is washed with water and then washed with an aqueous solution of sodium bisulfite, after which the solution is dried over anhydrous magnesium sulfate. The methylene chloride is then removed by distillation to give a yield of 97 g. of a red liquid. Fractional distillation of this product shows it to consist mostly of the isomer $ICF_2CH_2NO_2$ and minor amounts of the reverse addition product $ICH_2CF_2NO_2$. There was recovered from this run only 3 g. of iodoacetic acid.

Example 5

PREPARATION OF $ICF_2CH_2NO_2$

The procedure of Example 1 is repeated in a 300 milliliter stainless steel autoclave charged with 64 g. (1 mole) of vinylidene fluoride, 26 g. (0.28 mole) of $N_2O_4$, 77 g. (0.30 mole) of iodine and 100 milliliters of carbon tetrachloride. The entire charge of vinylidene fluoride is pressured into the autoclave and the autoclave and contents are shaken for 25 hours. There is obtained 9 g. of the desired product $ICF_2CH_2NO_2$.

Example 6

PREPARATION OF $ICF_2CHFNO_2$

Following the procedures of Example 1, trifluoroethylene $CF_2$=$CHF$ is pressured into a 1400 milliliter stainless steel autoclave containing 1 mole of $N_2O_4$, 1.5 moles of iodine and 500 milliliters of methylene chloride, and is shaken at room temperature for 10 hours. After working up the product as described in Example 1, the nitroiodide $ICF_2CHFNO_2$ is obtained.

Example 7

PREPARATION OF $ICF_2CH(NO_2)CF_3$

A 300 milliliter stainless steel autoclave is charged with 0.3 mole of $CF_2=CHCF_3$, 0.3 mole of $N_2O_4$, 0.5 mole of iodine and 100 milliliters of methylene chloride, after which the autoclave is heated with shaking for 20 hours at a temperature of 80° C. After working up the product as described in the previous examples, there is obtained the nitroiodide $ICF_2CH(NO_2)CF_3$.

Example 8

PREPARATION OF $ICF_2CH(NO_2)CF_2CH_2C_3F_7$

A 300 milliliter stainless steel autoclave is charged with 0.2 mole of the olefin $CF_2=CHCF_2CH_2C_3F_7$, 0.2 mole of $N_2O_4$, 0.4 mole of iodine and 80 milliliters of methylene chloride, and heated with shaking at a temperature of 80° C. for 20 hours. The liquid product from the autoclave is treated as described in the previous examples to separate the nitroiodide $ICF_2CH(NO_2)CF_2CH_2C_3F_7$.

We claim:
1. Fluorinated nitroiodides of the formula

$$ICF_2CHRNO_2$$

where R is selected from the class consisting of hydrogen, fluorine, perfluoroalkyl radicals and fluorohydroalkyl radicals.
2. The fluorinated nitroiodide $ICF_2CH_2NO_2$.
3. The fluorinated nitroiodide $ICF_2CHFNO_2$.
4. Fluorinated nitroiodides of the formula $$ICF_2CHRNO_2$$

where R is a perfluoroalkyl radical.
5. Fluorinated nitroiodides of the formula $$ICF_2CHRNO_2$$

where R is a fluorohydroalkyl radical.

References Cited in the file of this patent

Kuhn et al.: C.A., vol. 54:20825(b) 1960 c.f. Helv. Chim. Acta. 43, 607–17 (1960) QD1H4, copy in S.L.